United States Patent
Starnes et al.

(10) Patent No.: US 7,475,598 B2
(45) Date of Patent: Jan. 13, 2009

(54) ELECTROMECHANICAL FORCE TRANSDUCER

(75) Inventors: Mark William Starnes, Hungtingdon (GB); James John East, Northants (GB); Neil Simon Owen, Huntingdon (GB); Steven Mark Hoyle, Northants (GB)

(73) Assignee: New Transducers Limited, Huntingdon (GB)

( * ) Notice: Subject to any disclaimer, the term of this patent is extended or adjusted under 35 U.S.C. 154(b) by 52 days.

(21) Appl. No.: 11/372,345

(22) Filed: Mar. 10, 2006

(65) Prior Publication Data

US 2006/0207340 A1 Sep. 21, 2006

Related U.S. Application Data

(63) Continuation-in-part of application No. PCT/GB2004/003843, filed on Sep. 9, 2004.

(30) Foreign Application Priority Data

Sep. 11, 2003 (GB) ............................. 0321292.5
Jun. 3, 2005 (GB) ............................. 0511330.3

(51) Int. Cl.
*G01B 7/16* (2006.01)
(52) U.S. Cl. ...................... 73/778; 73/763; 73/769; 381/152; 381/190; 381/191; 181/157
(58) Field of Classification Search ............ 73/763, 73/769, 778; 381/152, 190, 191; 181/157
See application file for complete search history.

(56) References Cited

U.S. PATENT DOCUMENTS

| | | | |
|---|---|---|---|
| 3,440,363 A | 4/1969 | Boll | |
| 4,969,197 A | 11/1990 | Takaya | |
| 6,332,029 B1 * | 12/2001 | Azima et al. | 381/152 |
| 6,760,461 B2 * | 7/2004 | Azima et al. | 381/389 |
| 6,865,277 B2 * | 3/2005 | Bank et al. | 381/152 |
| 7,151,837 B2 * | 12/2006 | Bank et al. | 381/190 |
| 2001/0026625 A1 | 10/2001 | Azima et al. | |
| 2001/0033669 A1 * | 10/2001 | Bank et al. | 381/152 |
| 2003/0059068 A1 * | 3/2003 | Bank et al. | 381/152 |
| 2003/0059069 A1 | 3/2003 | Cassey et al. | |

FOREIGN PATENT DOCUMENTS

| | | |
|---|---|---|
| WO | WO 01/54450 A2 | 7/2001 |
| WO | WO 03/009219 A2 | 1/2003 |
| WO | WO 03/098964 A2 | 11/2003 |

* cited by examiner

*Primary Examiner*—Edward Lefkowitz
*Assistant Examiner*—Freddie Kirkland, III
(74) *Attorney, Agent, or Firm*—Roylance, Abrams, Berdo & Goodman, L.L.P.

(57) ABSTRACT

An electromechanical force transducer comprises at least two adjacent resonant elements and a damping layer coupled between their adjacent faces. The damping layer is selected so that the output is increased in the region of internal cancellation in the transducer. The adjacent resonant elements are beam-like and have substantially the same length. The resonant elements may be supported on a stub of low rotational stiffness whereby the fundamental resonance of the transducer becomes less dependent on bending motion of the transducer and more rigid body-like. The transducer may also include a member for increasing the rotational impedance of the transducer.

21 Claims, 8 Drawing Sheets

........... 1 beam

———— 2 beam, damping

............ undamped

– – – – – 1/2 damping

———— full damping

- - - - - - 36mm beam, central mount
————— 18mm beam, cantilever, soft stub
················· 18mm beam, cantilever, hard stub

- - - - - - Stub E = 1E8
————— Stub E = 2E9
················· Stub E = 4E10

US 7,475,598 B2

ELECTROMECHANICAL FORCE TRANSDUCER

This application is a continuation-in-part of International patent application No. PCT/GB2004/003843, filed Sep. 9, 2004, which is incorporated herein by reference in its entirety.

TECHNICAL FIELD

The invention relates to electromechanical force transducers, actuators, exciters and the like devices and more particularly but not exclusively, to such devices for use in acoustic apparatus, e.g. loudspeakers and microphones.

BACKGROUND

The invention relates particularly, but not exclusively, to electromechanical force transducers of the kind described in International patent application WO01/54450 to the present applicant (incorporated herein by reference), and comprising one or more resonant elements or beams having a frequency distribution of modes in the operative frequency range of the transducer. Such transducers are known as "distributed mode actuators" or DMA for short.

It is an object of the invention to provide a transducer in which damping is provided to result in a reduction of Q of the modes and a reduction in the severity of cancellation between modes to give an increased smoothness of acoustic pressure.

It is also an object of the invention to improve the robustness of the transducer e.g. to give a reduction of chance of failure during drop or impact tests.

Another object of the invention is to reduce the first resonant mode frequency of an actuator or transducer, e.g. a DMA transducer.

Yet another object of the invention is to reduce the sensitivity of transducer performance to the properties of the panel to which it is attached.

SUMMARY DISCLOSURE OF THE INVENTION

From one aspect, the invention is a transducer of the kind described wherein a low stiffness layer is inserted between, and bonded to the adjacent faces of a plurality of resonant elements. We have found that simply adding a damping layer to one face of a resonant element or beam gives poor damping performance as the layer stretches with the element as the element face changes dimensions. However, using a flexible reference layer with a high resistance to dimensional change, such as a foil, on the other side of the damping layer results in an improvement in damping as the damping layer now shears between the changing element face dimension and the non-stretching foil. If the reference layer can be made to change dimension in opposition to the damped face, the damping effect will be doubled. This is the effect gained by adhering the damping layer between adjacent element faces.

From another aspect the invention is a DMA transducer wherein out of plane DMA modes are introduced into the audio band.

From yet another aspect, the invention provides a bending inertial vibration transducer comprising a resonant element; a coupling member on the resonant element for mounting the transducer to a site to which vibration force is to be applied or taken; the transducer further comprising a member for increasing the rotational impedance presented to the coupling member adjacent said site.

The member for increasing the rotational impedance may be configured as a foot extending laterally from the coupling member, i.e. transversely to the first direction in which the vibration force is applied or taken.

The foot may be integral with the coupling member. The foot may extend further in a lateral direction than does the coupling member.

The resonant element may be attached to the coupling member as a cantilever. The foot may extend from the coupling member in the same direction as the cantilever. The foot may extend from the coupling member solely in the same direction as the cantilever.

BRIEF DESCRIPTION OF THE DRAWING

Embodiments that incorporate the best mode for carrying out the invention are described in detail below, purely by way of example, with reference to the accompanying drawing, in which.

DETAILED DESCRIPTION

Figure 1:
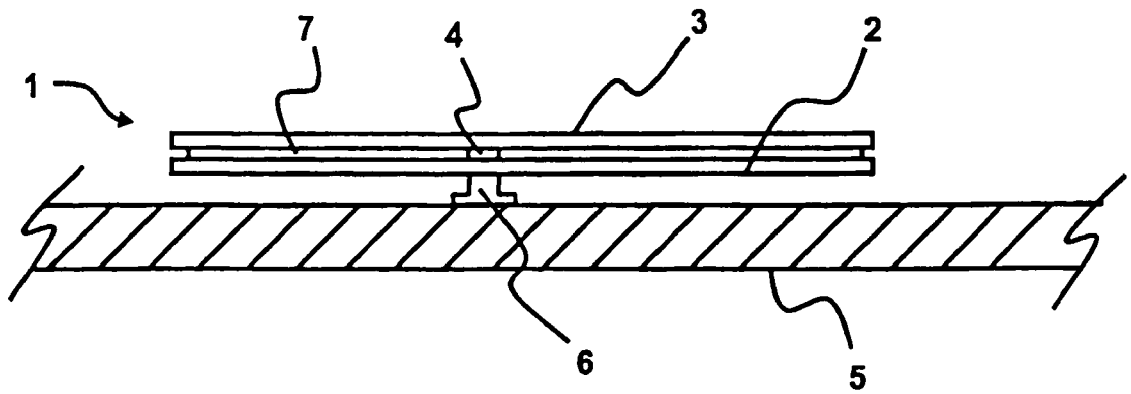
FIG. 1 is a side view of a first embodiment of electromechanical force transducer of the present invention.

FIG. 1 shows a double beam transducer of the kind generally described in WO01/54450, the text of which is incorporated in the present application. The transducer (1) comprises a first piezoelectric beam (2) on the back of which is mounted a second piezoelectric beam (3) by connecting means in the form of a rigid stub (4) located near to the centre of both beams. Each beam is a bimorph.

The transducer (1) is mounted on a structure (5), e.g. a bending-wave loudspeaker panel, e.g. a distributed mode loudspeaker (DML), by coupling means in the form of a rigid stub (6) located near to the centre of the first beam.

In the present invention a low stiffness layer (7) of foamed plastics is bonded between adjacent faces of the two beams (2,3). The bonded layer may cover substantially the whole of the adjacent faces or may be discontinuous, e.g. to damp certain modes.

The following sets out some parameters for one suitable foam damping material.

"Poron" slow rebound foam polyurethane plastics material.

Type: 4790-92-25041-04S.

Thickness: 1.05 mm (we have also tried 1.0 mm with success).

Density: 400 kg/m3.

Compressional E (Young's Modulus with the foam in compression)=2 MPa at 1 kHz.

The measured resistance, R, is approx $8\times10^5$ Ns/m3. These figures are the measured 'real' part of the mechanical resistance when in compression, not shear. Shear figures are not available.

Use of a thinner foam (0.6 mm) also gave good results. A thicker foam, say up to 1.5 mm would be expected to give good results with this material. We suggest thickness limits between 0.3 and 2.0 mm.

The density (in isolation from E and R) is expected to be irrelevant, and could vary by a factor of 100 and have little effect. E is important but the shearing that is occurring makes the importance of E difficult to identify. We suggest a factor of 4 increase in E would start to stiffen the beam, so is to be avoided. A reduction of E would have little effect as it appears the system stiffness is not being affected too much by the addition of the foam. The R figure is important. Reducing R is expected to effect damping in a linear fashion. We suggest that it is not reduced by more than a factor of say 4. Increasing R is good but cannot be achieved without affecting the other parameters.

Figure 2A:
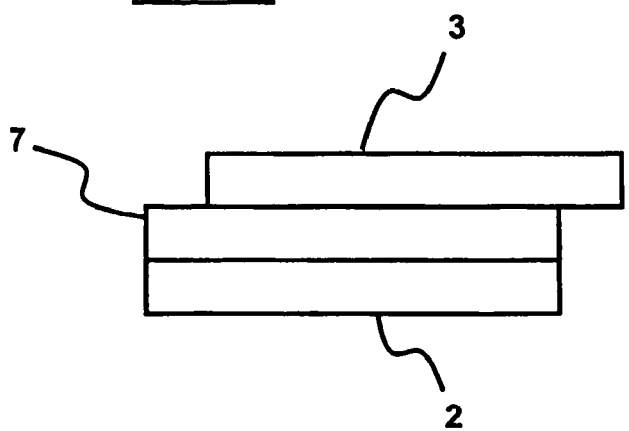
FIG. 2a is a side view of part of an electromechanical force transducer.
Figure 2B:
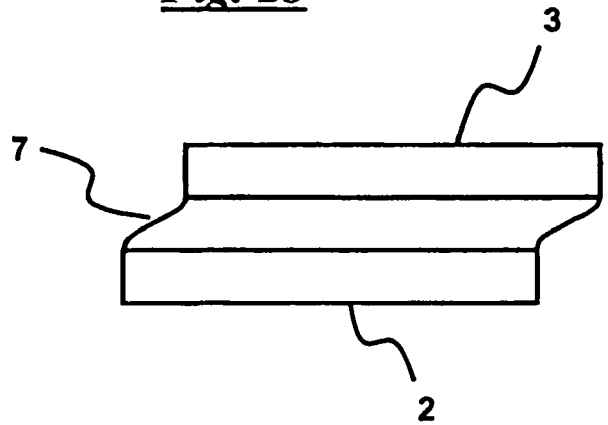
FIG. 2b is a side view of a first embodiment of electromechanical force transducer of the present invention.

FIG. 2 shows the effect of bonding to one face or to both faces of multibeam transducer. FIG. 2a shows the case where the damping layer (7) is only bonded to one beam (2). When the other beam (3) moves in relation to (2), it slides over the upper surface of the damping layer, which therefore does not deform and adds little damping to the bending resonances. However, in FIG. 2b, the damping layer is bonded to both beams, and so is forced into shear by the relative movement of beam (3) in relation to beam (2). It is this shearing which applies damping.

Figure 3:
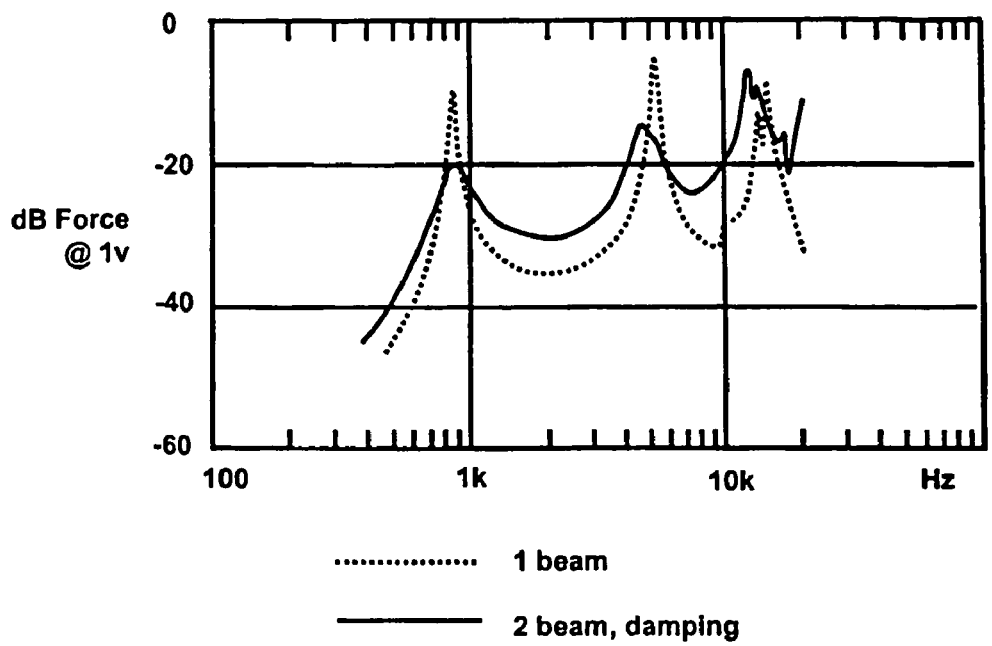
FIG. 3 is a graph comparing blocked force of a single beam transducer and the transducer of FIG. 1.

The beam lengths need not be the same but maximum damping effect is expected if they are. The measured effect of adding a damping layer between two beams on the blocked force of a centrally mounted transducer is shown in FIG. 3. The Q of all modes is reduced and the natural frequencies have not changed implying extremely low stiffness of bond material (7). Adding the damping layer increases output when cancellation inside the transducer is occurring, such as between the resonances of dissimilar length beams.

Figure 4:
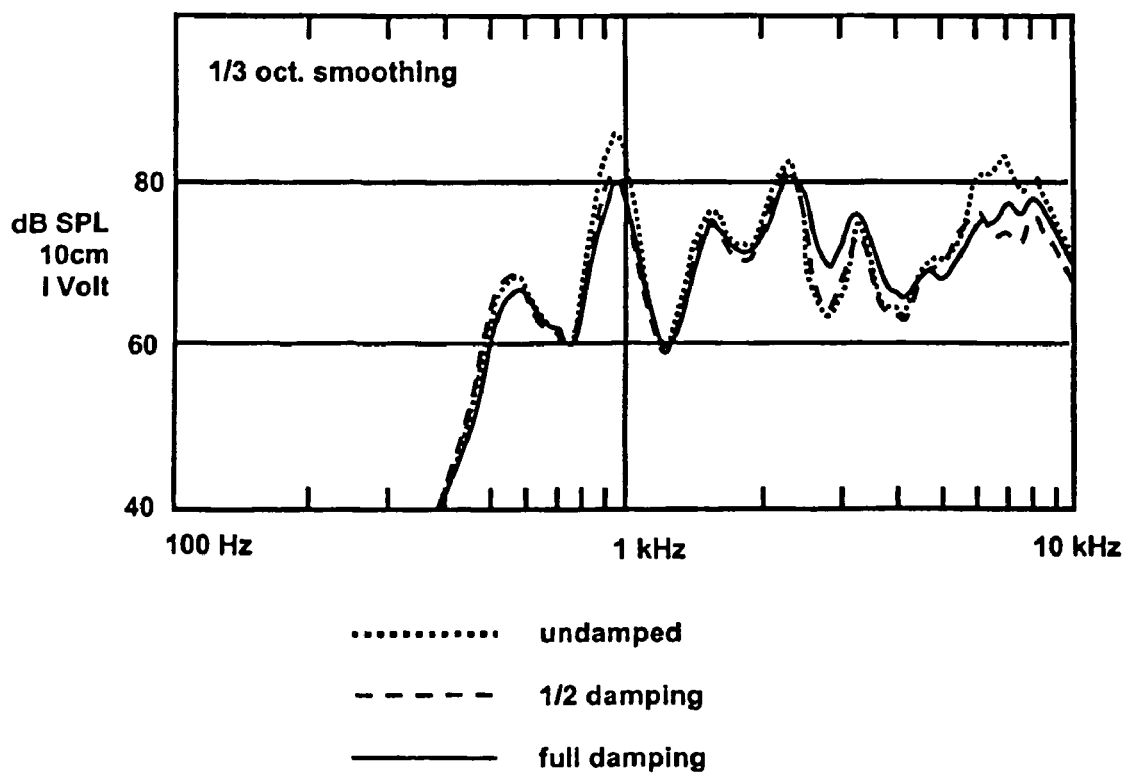
FIG. 4 is a graph comparing acoustic pressure between an undamped double beam DMA, a ½ damped DMA (that is with damping material bonded between the resonant elements over half the lengths of the resonant elements) and a fully damped double beam DMA transducer.

FIG. 4 shows the simulated effect on acoustic pressure of adding a damping between the faces of a 36 mm/34 mm beam length DMA transducer. Output at the transducer fundamental is slightly reduced, but a broad increase in output occurs in 3-4 kHz region. This is the region of internal cancellation in the transducer. The acoustic pressure response is also smoother.

Drop test failure rates are expected to be reduced. At impact most of the energy will be present in the exciter at its fundamental resonance. Since the damping reduces the Q of this resonance, the instantaneous maximum displacement will be reduced, resulting in reduced stress in the beam. This stress reduction is expected to improve drop test reliability. In addition, the build height of the transducer can be reduced by the present invention.

Figure 5:
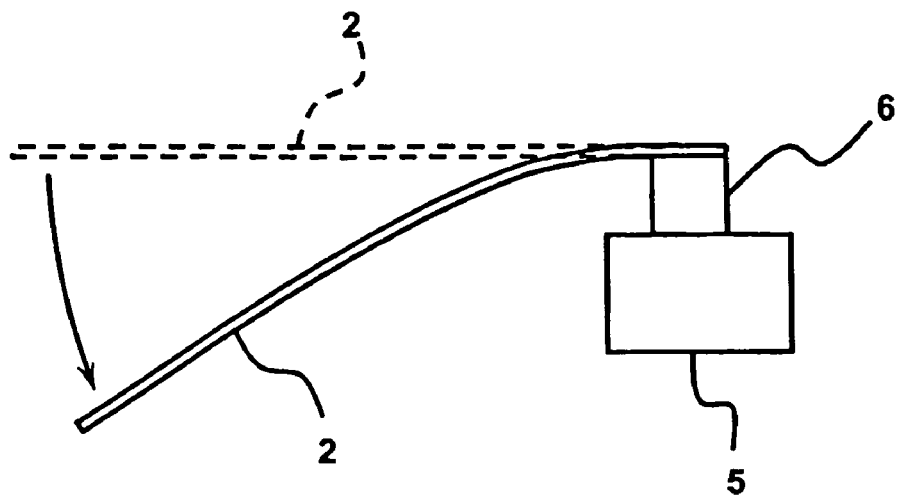
FIG. 5 is a side view of a single beam actuator.

The stub used to couple a transducer of the kind described above to its load is stiff in all 3 Cartesian axes and rotational stiffness is usually ignored, and is assumed to be high. For the case of a beam with stub position halfway along its length, 0 rotation occurs at the stub for the beam fundamental resonance. If this 0 rotation boundary condition is replicated at the end of a half length beam the fundamental will occur at the same frequency as the full length beam, with half the force. This is the cantilever condition, see FIG. 5. FIG. 5 is a diagram showing fundamental mode shape of a cantilever beam (that is an extreme offset stub). The displaced shape shows pure bending motion.

Figure 6:
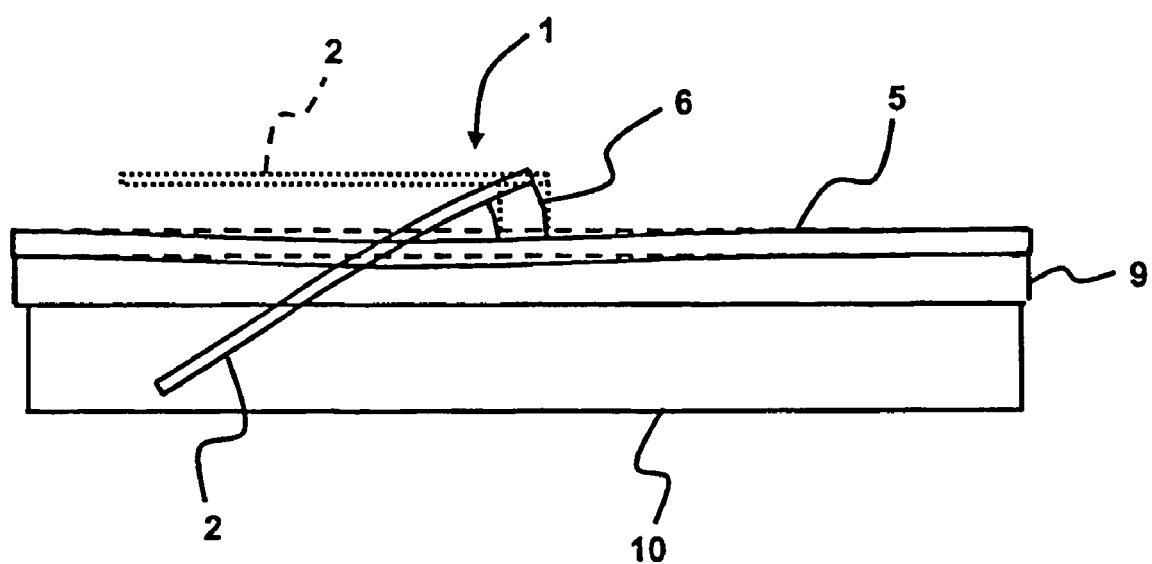
FIG. 6 is a side view of a second embodiment of electromechanical force transducer of the present invention.

However by reducing the stub rotational stiffness from this high value to a lower one, the f0 of the beam drops and becomes less dependent on bending motion of the beam and more rigid body-like, see FIG. 6. FIG. 6 is a diagram of a modeshape of a beam coupled to a panel with a soft stub allowing rotation of the beam, the modeshape showing some bending in the beam and some rotational translations. In the limiting case of a rotational stiffness of 0, the mode drops to 0 Hz and is a rigid body mode. Reference (9) represents a trapped air layer behind the panel (5), which in the simulation couples to the panel and affects the modal set of resonances in the panel, and reference (10) represents the body of a cell phone containing a loudspeaker formed by the panel (5) and transducer (1). It will be noted that the deflection of the beam (2) is greatly exaggerated so that it is visible.

Figure 7:
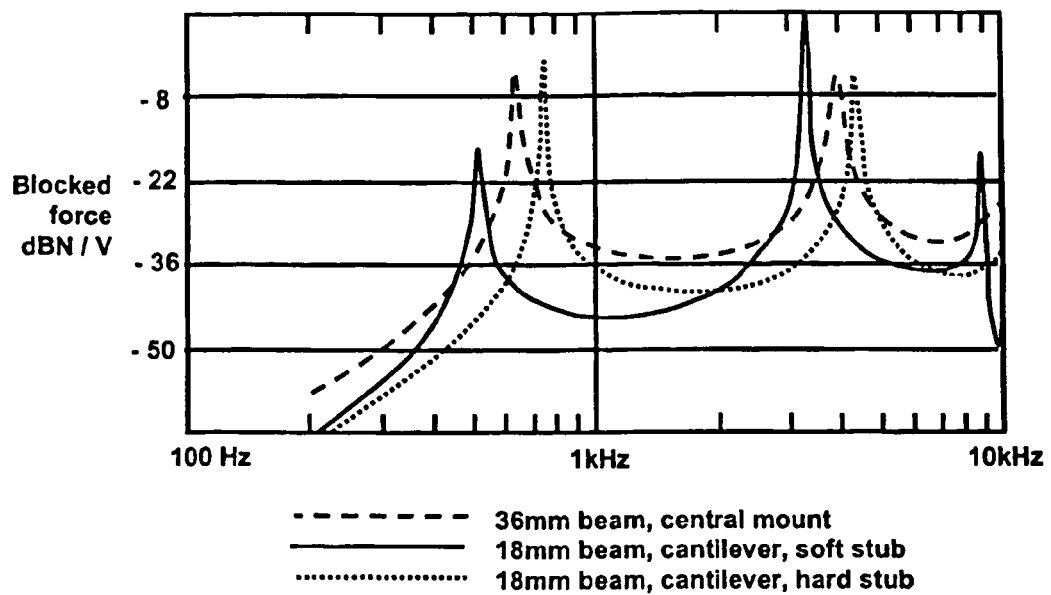
FIG. 7 is a graph comparing blocked force under different conditions.

By choosing this rotational compliance the f0 of the beam can be lower than the f0 of a beam twice its length, mounted at its centre—FE analysis has been used to show this effect, see FIG. 7. FIG. 7 is a graph of simulated blocked force generated by 3 conditions: a 36 mm beam centrally mounted, a half length beam with stiff stub at end and half length beam with compliant stub at the end. The hard stub case causes a stiffening of the beam, effectively reducing its length slightly.

Figure 8A:
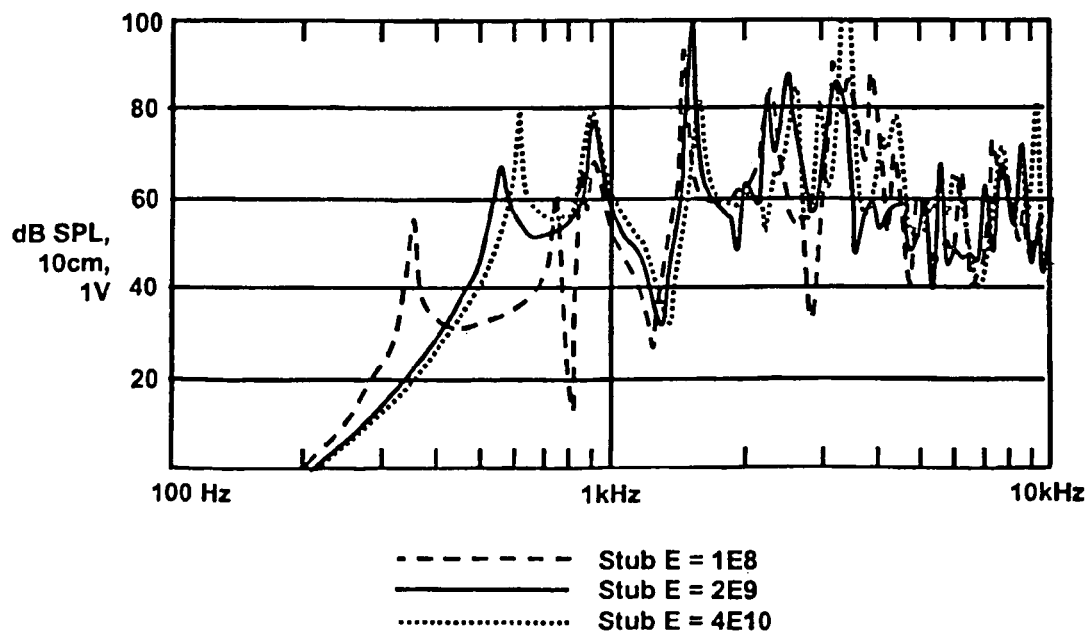
FIG. 8a is a graph comparing acoustic pressure under different conditions.
Figure 8B:
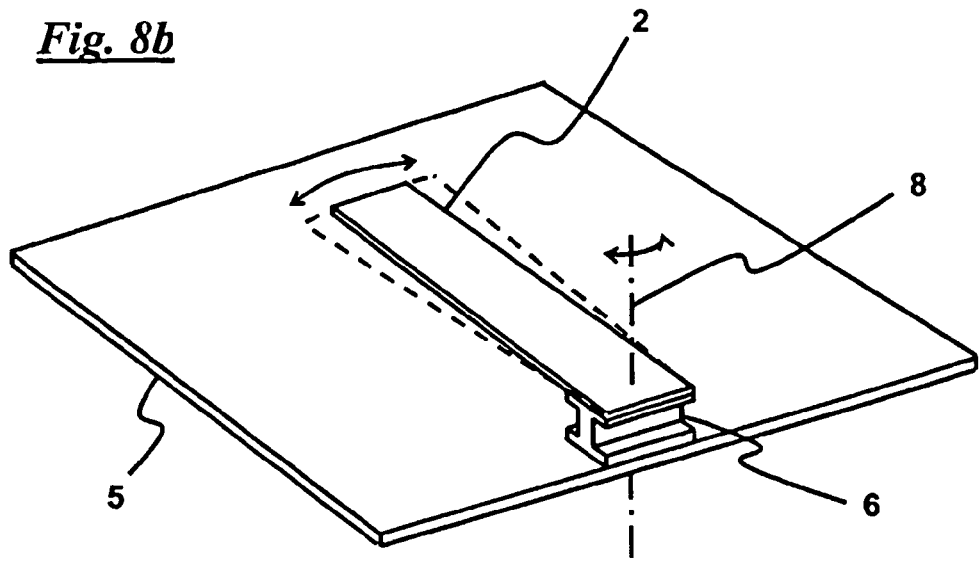
FIG. 8b is a perspective view of a transducer of the kind shown in FIG. 6 mounted at a panel edge.

A solid stub will have the same stiffness in the 3 translational and rotational axes. By suitably profiling the cross-sectional shape of the stub, different stiffnesses in the 6 different axes can be generated. The result is that modes in the different axes occur at different frequencies. If the load impedance is asymmetric, modes involving movement in directions other than normal to the beam surface can couple into the panel, providing increased modal density, see FIG. 8. FIG. 8a is a graph of simulated effect on acoustic pressure generated by changing stub stiffness. FIG. 8b is a perspective view of a panel-form loudspeaker having a panel (5) with an attached transducer mounted on a soft stub (6) of I-beam section and showing the DMA moving in-plane. In the case of the in-plane mode illustrated in FIG. 8, this mode is not present if the rotational stiffness around the axis (8) normal to the plane of the panel is ignored. In this case the first mode is partly due to rotational stiffness around the axis along the short edge of the beam, the second mode is due to the stiffness around the axis normal to the beam. The last rotational axis, around the axis moving along the length of the beam will also generate a mode.

Figure 9:
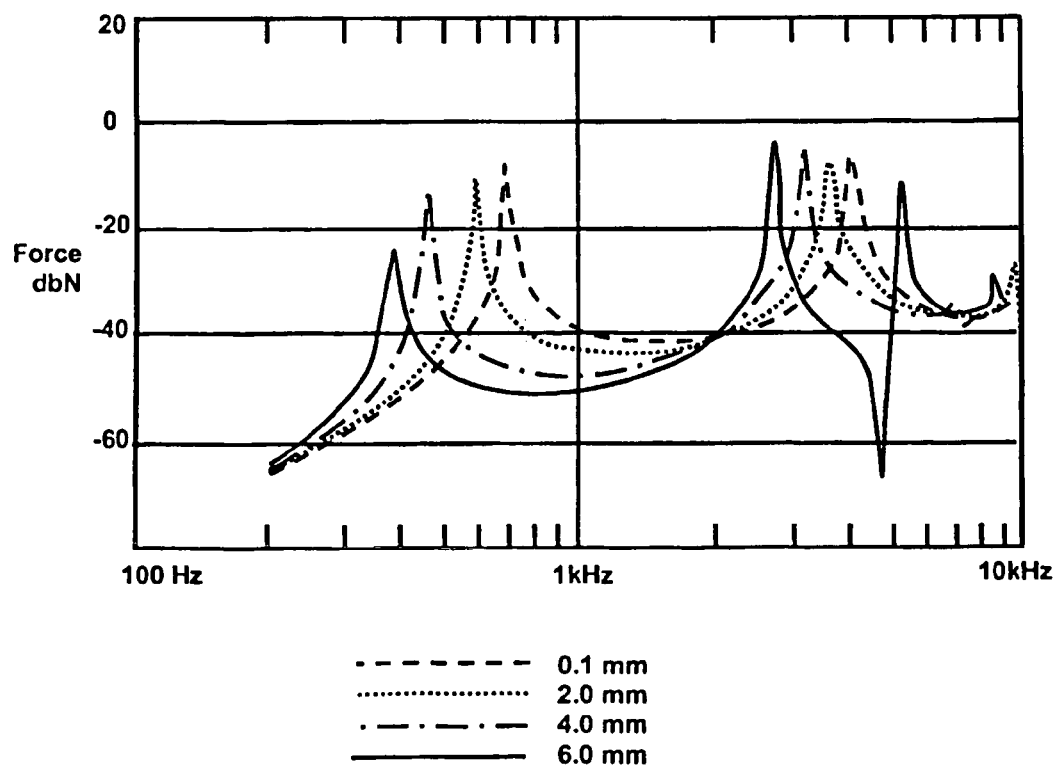
FIG. 9 is a graph comparing blocked force with different compliant stubs.

An example of a stub shape giving different stiffnesses in different axes is an I-section, see FIG. 9. FIG. 9 is a graph of simulated effect on blocked force of polycarbonate I-section stub with varying vertical bar lengths. The stub is 3 mm wide in total with inner bar of 1 mm width, bar length being specified on the plot.

By changing the fundamental resonance from a purely bending motion in the beam to a partly translatory motion, the stress in the beam is reduced at the fundamental. Since the fundamental resonance will receive the most energy during impact, the beam is more likely to survive without damage as most of the deformation will occur in the stub.

Although a stub of I-beam section has been described, many other stub cross-sections could be used, for example, trapezoidal, cylindrical and so forth.

When a transducer of the kind mentioned above is mounted as shown in FIG. 1, namely on a bending-wave acoustic panel of the kind known from WO97/09842 (incorporated herein by reference), it may show bandwidth sensitivity to panel impedance as a result of the fundamental frequency, f0, of the transducer depending on the rotational impedance presented to its stub or coupling member. This will be evident from a comparison of FIGS. 10A and B, which show the variation with frequency F in sound pressure level (in dB, measured at a distance of 10 cm, 1V RMS) generated by a transducer applied to a thinner panel and a thicker panel respectively.

Figure 11:
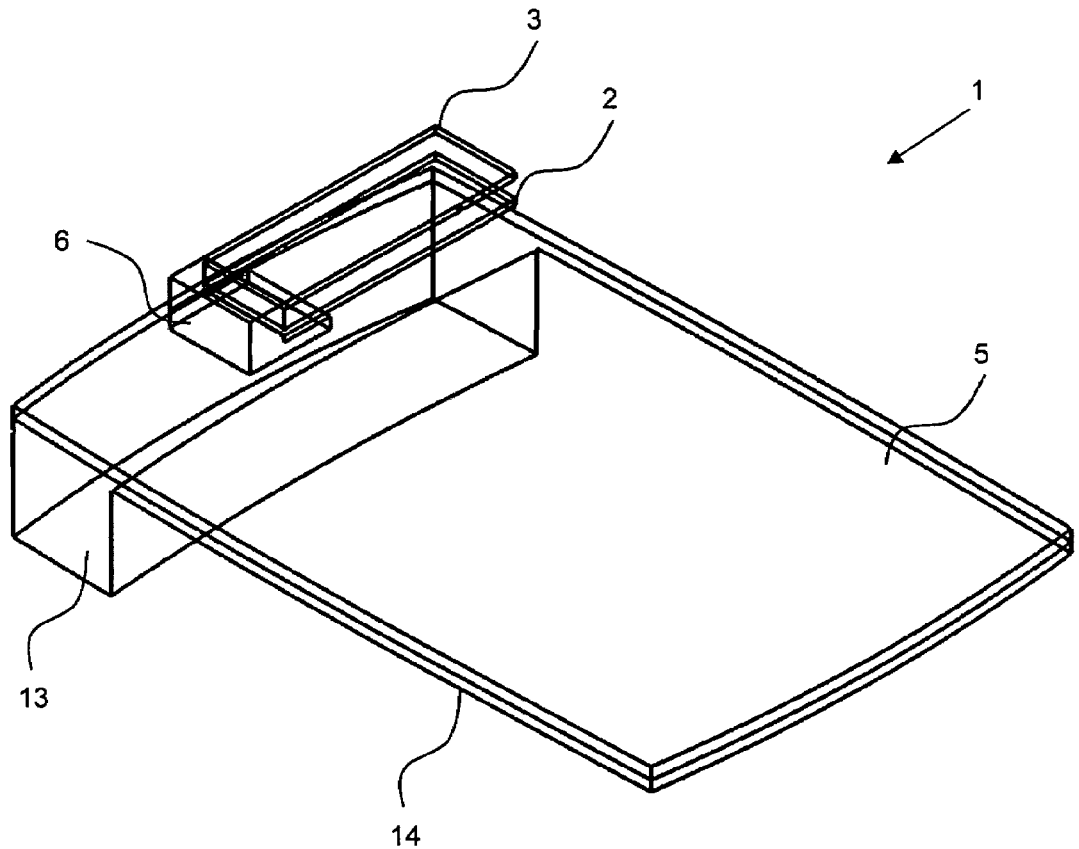
FIG. 11 is a perspective framework view of an embodiment of a third aspect of the present invention.
Figure 12:
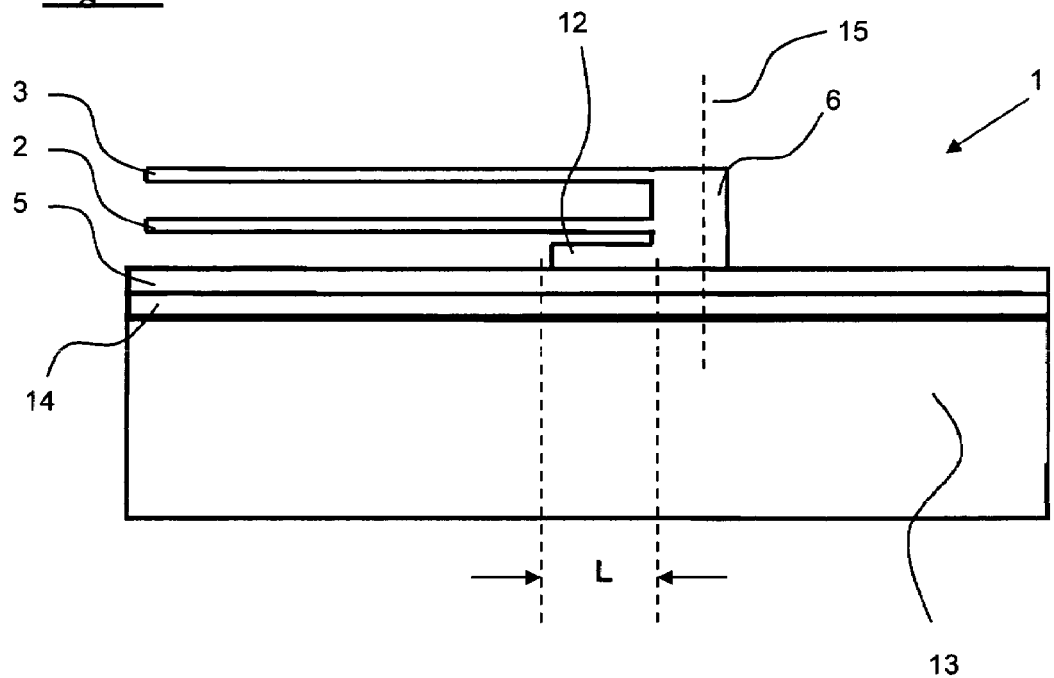
FIG. 12 is a rear elevation of the embodiment of FIG. 11.

The dashed line in each figure shows the response for the loudspeaker arrangement shown in FIGS. 11 and 12 in which a transducer 1 comprises first and second piezoelectric beams 2,3 attached in cantilever fashion to a stub 6. The stub has an integral foot 12 extending transversely in the same direction as the cantilever piezoelectric beams. Stub and foot are in turn connected to panel 5 to apply a force substantially in direction 15.

Foot 12 extends substantially transversely to direction 15 and solely in the same direction as the cantilever. It has a length L of 2 mm, a thickness of 0.7 mm and is made of plastic, for example polycarbonate or an engineering plastic such as Grilamid(™) or Grivory(™) sold by EMS-Grivory. The latter material has a Young's Modulus of 68 GPa, many times larger than polycarbonate, and a density of 2700 kg/m3.

Panel 5 is made of polycarbonate of typically 1 mm thickness and has at its rear surface a relatively thick air pocket 13 that extends across the panel at that end of the panel at which the transducer 1 is mounted and a thinner air pocket 14 extending over the remainder of the panel.

Figure 10A:
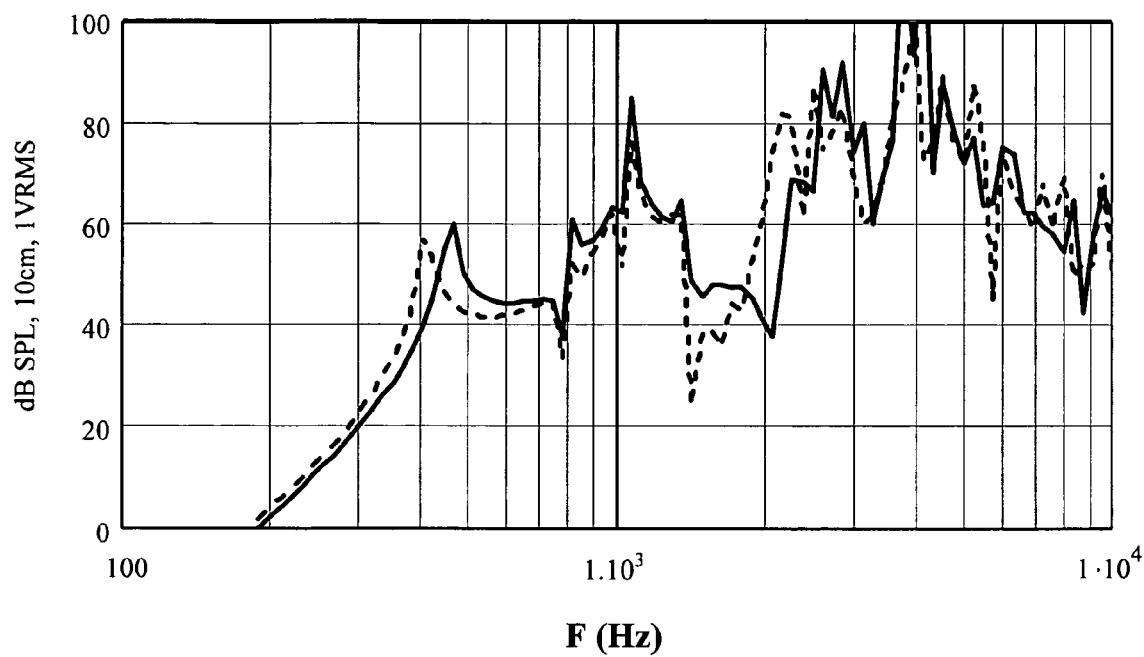
FIGS. 10A and B show the variation with frequency F in sound pressure level generated by a transducer applied to a thinner panel and a thicker panel respectively.
Figure 10B:
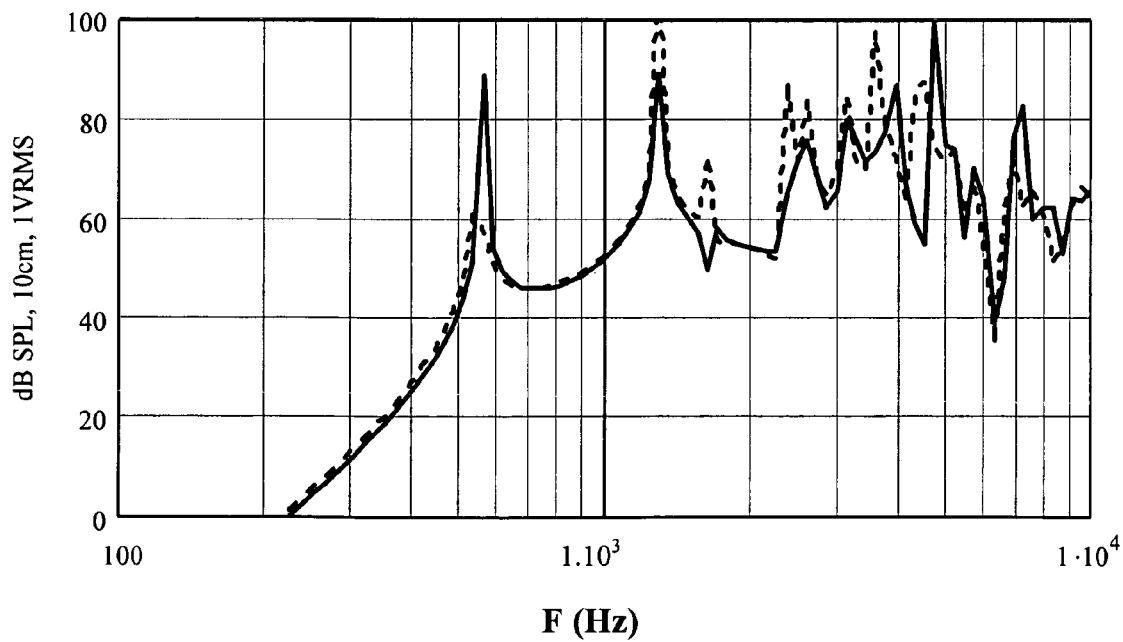

The dashed line of FIG. 10A shows results for the thinner panel having 0.6 mm thickness whilst the dashed line of FIG. 10B shows results for the thicker panel having 1.5 mm thickness. It will be seen that in moving from the thinner panel to the thicker panel, the lowest (f0) resonant frequency of the transducer increases by 130 Hz from 403 Hz to 533 Hz, effectively reducing the bandwidth of the loudspeaker, in particular at its lower end.

Figure 13:
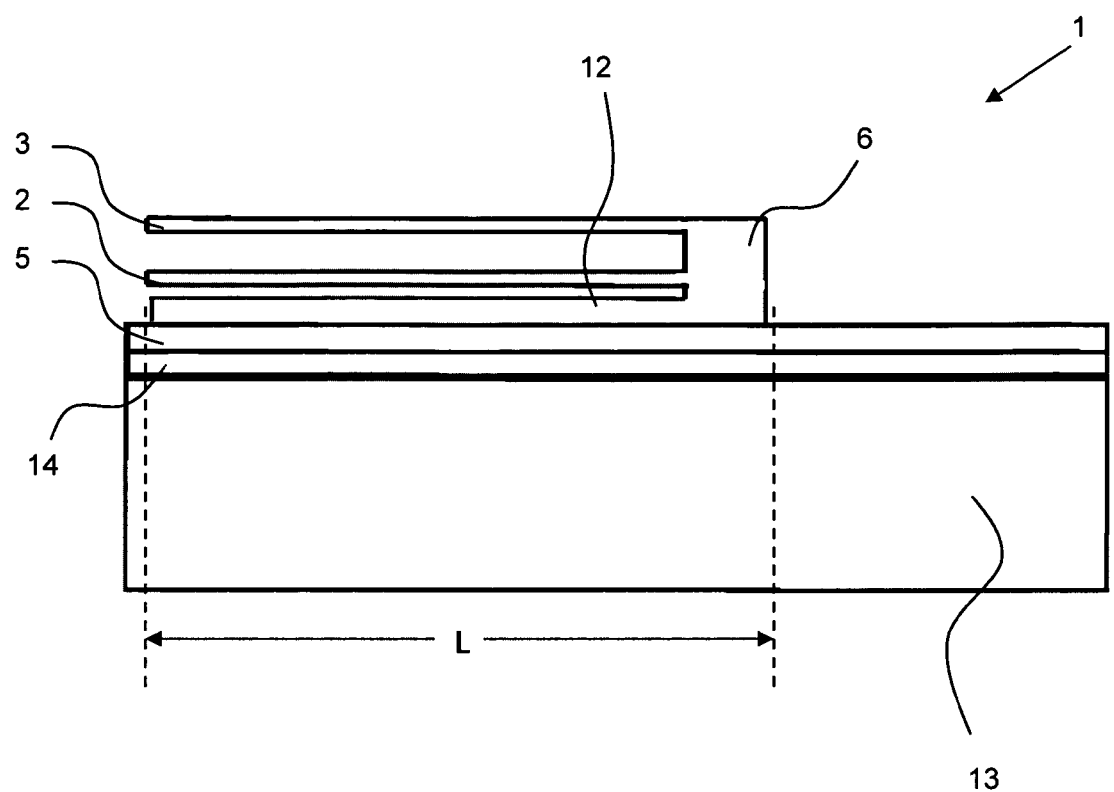
FIG. 13 is a similar view to that of FIG. 12 and showing a further embodiment of a third aspect of the present invention.

The solid lines of FIGS. 10A and 10B illustrate how this increase can be reduced—from a jump of 130 Hz to a jump of 95 Hz (from an f0 of 464 Hz to an f0 of 559 Hz)—by the use of a foot having greater length and thickness of 4 mm and 1 mm respectively. FIG. 13 illustrates the arrangement of FIG. 12 incorporating a longer foot that extends further in the direction transverse to axis 15 than does the stub 6. Such increased foot length and thickness result combine to present an increased rotational impedance to the transducer stub 6, particularly adjacent the point at which the stub is attached to the panel. As evidenced by FIGS. 10A and B, increasing the rotational impedance presented to the stub reduces the sensitivity of transducer performance to the properties of the panel to which it is attached. Such a reduction in sensitivity may be particularly desirable where the transducer and/or bending wave member are mass-produced items and modifications to suit particular configurations would involve significant costs.

The invention claimed is:

1. An electromechanical force transducer comprising:
   at least two adjacent resonant elements,
   a damping layer coupled between the adjacent faces of said at least two adjacent resonant elements, and
   a stub member on which the resonant elements are supported and for coupling the transducer to a site to which force is to be applied,
   wherein the damping layer is selected so that the output is increased in the region of internal cancellation in the transducer, and
   wherein said at least two adjacent resonant elements are beam-like and have substantially the same length.

2. A transducer according to claim 1, wherein the damping layer is of foamed plastics.

3. A transducer according to claim 2, wherein the foamed plastics is of slow rebound characteristic.

4. A transducer according to any one of claims 1 to 3, wherein the damping layer is in the form of a layer bonded to the whole of, or to a substantial part of, the adjacent faces of the resonant elements.

5. A transducer according to claim 1, wherein the stub is of low rotational stiffness whereby the fundamental resonance of the transducer becomes less dependent on bending motion of the transducer and more rigid body-like.

6. A transducer according to claim 5, wherein the stub has different stiffnesses in the translational and rotational axes whereby modes in different axes occur at different frequencies.

7. A transducer according to claim 5, wherein the cross-sectional shape of the stub is non-circular.

8. A transducer according to claim 7, wherein the cross-sectional shape of the stub is of I-section.

9. An electromechanical force transducer according to claim 1, wherein the resonant elements have a frequency distribution of modes in the operative frequency range of the transducer.

10. A transducer according to claim 9, wherein the parameters of the resonant elements are selected to enhance the distribution of modes in the elements in the operative frequency range with the parameters being selected from the group consisting of aspect ratio, isotropy of bending stiffness, isotropy of thickness and geometry.

11. A transducer according to claim 1, wherein at least one of the resonant elements is of piezo material.

12. A transducer according to claim 1, wherein the damping layer is coupled between substantially the whole of the adjacent faces.

13. A bending inertial vibration transducer according to claim 1, further comprising a member for increasing the rotational impedance presented to the coupling member adjacent said site.

14. A transducer according to claim 13, wherein said vibration force is applied or taken substantially in a first direction, the member for increasing the rotational impedance being configured as a foot extending laterally from the coupling member and transversely to said first direction.

15. A transducer according to claim 14, wherein said foot is integral with the coupling member.

16. A transducer according to claim 14 or 15, wherein said foot extends further in said lateral direction transverse to said first direction than does the coupling member.

17. A transducer according to claim 14 or 15, wherein the resonant element is attached to the coupling member as a cantilever.

18. A transducer according to claim 17, wherein the foot extends from the coupling member in the same direction as the cantilever.

19. A transducer according to claim 18, wherein the foot extends from the coupling member solely in the same direction as the cantilever.

20. A loudspeaker comprising a transducer according to claim 1, and a bending-wave panel-form acoustic radiator to which the transducer is coupled.

21. A transducer according to claim 1, wherein the difference in said beam lengths is less than 6%.

* * * * *